(12) United States Patent
Volcker et al.

(10) Patent No.: US 8,903,171 B2
(45) Date of Patent: Dec. 2, 2014

(54) DETECTION AND SUPPRESSION OF FLICKER IN A SEQUENCE OF IMAGES

(75) Inventors: Bjorn Volcker, Bromma (SE); Willem Bastiaan Kleijn, Lower Hutt (NZ)

(73) Assignee: Google Inc., Mountain View, CA (US)

( * ) Notice: Subject to any disclaimer, the term of this patent is extended or adjusted under 35 U.S.C. 154(b) by 364 days.

(21) Appl. No.: 13/521,144

(22) PCT Filed: Feb. 6, 2010

(86) PCT No.: PCT/EP2010/057752
§ 371 (c)(1),
(2), (4) Date: Jul. 9, 2012

(87) PCT Pub. No.: WO2010/142591
PCT Pub. Date: Dec. 16, 2010

(65) Prior Publication Data
US 2012/0281914 A1    Nov. 8, 2012

Related U.S. Application Data

(60) Provisional application No. 61/186,251, filed on Jun. 11, 2009.

(30) Foreign Application Priority Data

Jun. 9, 2009  (EP) ..................... 09162228

(51) Int. Cl.
*G06K 9/00*   (2006.01)
*H04N 5/235*  (2006.01)
*H04N 7/01*   (2006.01)
*H04N 5/14*   (2006.01)

(52) U.S. Cl.
CPC .............. *H04N 5/2357* (2013.01); *H04N 5/144* (2013.01); *H04N 7/0132* (2013.01)
USPC ...................................................... 382/165

(58) Field of Classification Search
None
See application file for complete search history.

(56) References Cited

U.S. PATENT DOCUMENTS 4,595,946 A   6/1986   Uehara et al.
4,833,525 A   5/1989   Suzuki et al.
(Continued)

FOREIGN PATENT DOCUMENTS

CN   1525747    9/2004
CN   1714565    12/2005
(Continued)

OTHER PUBLICATIONS

Ketcham, "Real-Time Image Enhancement Techniques," 1976.*
(Continued)

*Primary Examiner* — Vu Le
*Assistant Examiner* — Alexander J Lesnick
(74) *Attorney, Agent, or Firm* — Young Basile Hanlon & MacFarlane P.C.

(57) ABSTRACT

The invention relates to a method, device and computer-program product for detection of undesired temporal variations (flicker) in a sequence of video frames. In one embodiment, frame-wise luminance means are compared with a reference level and the crossing frequency is compared with expected variation frequencies, such as frequencies associated with an illumination frequency through aliasing. The crossings count can be refined by introducing a latency zone around the reference level. In case of a positive detection of an undesired temporal variation, there is further provided a correction method, device and computer-program product using cumulated distribution functions. The visual detriment of flicker-induced saturation of pixels is alleviated either by brightening non-saturated pixels or by replacing the saturated pixels by randomly sampled values in accordance with a reference cumulated distribution function. The invention provides embodiments suitable for real-time processing of streamed video sequences.

19 Claims, 5 Drawing Sheets

(56) References Cited

U.S. PATENT DOCUMENTS

| | | | |
|---|---|---|---|
| 5,053,871 A | 10/1991 | Ogawa et al. | |
| 5,239,369 A | 8/1993 | Suzuki et al. | |
| 5,272,539 A | 12/1993 | Kondo et al. | |
| 5,293,238 A | 3/1994 | Nakano et al. | |
| 5,727,080 A | 3/1998 | Cox et al. | |
| 5,793,886 A * | 8/1998 | Cok | 382/169 |
| 6,097,837 A | 8/2000 | Cok | |
| 6,271,884 B1 * | 8/2001 | Chung et al. | 348/370 |
| 7,084,901 B2 | 8/2006 | Smith et al. | |
| 7,218,777 B2 | 5/2007 | Asano et al. | |
| 7,502,054 B2 * | 3/2009 | Kalapathy et al. | 348/226.1 |
| 7,869,652 B2 * | 1/2011 | Asano et al. | 382/168 |
| 2003/0067546 A1 * | 4/2003 | Asano | 348/226.1 |
| 2003/0120365 A1 * | 6/2003 | Asano | 700/86 |
| 2004/0165084 A1 * | 8/2004 | Yamamoto et al. | 348/226.1 |
| 2005/0018920 A1 | 1/2005 | Ramamurthy | |
| 2007/0036213 A1 | 2/2007 | Matsumura et al. | |
| 2007/0046789 A1 * | 3/2007 | Kirisawa | 348/226.1 |
| 2007/0046790 A1 | 3/2007 | Nakasuji et al. | |
| 2007/0146501 A1 | 6/2007 | Matsuoka | |
| 2007/0153094 A1 * | 7/2007 | Noyes et al. | 348/226.1 |
| 2009/0141176 A1 * | 6/2009 | Tomisaka et al. | 348/671 |
| 2010/0053199 A1 | 3/2010 | Robert et al. | |
| 2011/0050997 A1 * | 3/2011 | Kleijn et al. | 348/497 |

FOREIGN PATENT DOCUMENTS

| | | |
|---|---|---|
| CN | 101057489 | 10/2007 |
| EP | 0686941 A2 | 12/1995 |
| EP | 0973128 A2 | 1/2000 |
| EP | 1024660 A2 | 8/2000 |
| EP | 1753226 A1 | 2/2001 |
| EP | 1091571 A2 | 4/2001 |
| EP | 1324598 A2 | 7/2003 |
| EP | 1383083 A2 | 1/2004 |
| EP | 1242975 B1 | 1/2005 |
| EP | 1566962 A1 | 8/2005 |
| EP | 1725023 A2 | 11/2006 |
| EP | 1758374 A2 | 2/2007 |
| EP | 1763228 A2 | 3/2007 |
| EP | 1814310 A1 | 8/2007 |
| EP | 2262228 A1 | 12/2010 |
| JP | 2004222228 | 8/2004 |
| JP | 2004260574 | 9/2004 |
| WO | 0124535 A1 | 4/2001 |

OTHER PUBLICATIONS

Naranjo, V. et al. "Flicker reduction in old films." Image Processing, 2000. Proceedings 2000 International Conference, Sep. 10-13, 2000, IEEE, Piscataway, NJ, USA. vol. 2, pp. 657-659. ISBN 978-0-7803-6297-0.

European Search report for EP Application No. 09175939.9 dated Nov. 3, 2010.

Patent Cooperation Treaty International Search Report for International Application No. PCT/EP2010/062717 mailed Nov. 3, 2010.

European Search Report dated Oct. 20, 2009 from the corresponding EPO Application No. EP 09162228.2 filed Jun. 9, 2009.

Chinese Office Action in related matter. CN 2010800349031 2 pp; mailed Dec. 24, 2013.

Japanese Office Action in related matter. JP2012514425, mailed Apr. 8, 2014.

Australian Examination Report dated Jan. 28, 2014, from the corresponding Australian Application No. AU2010257615, filed Jun. 9, 2009.

* cited by examiner

DETECTION AND SUPPRESSION OF FLICKER IN A SEQUENCE OF IMAGES

CROSS-REFERENCE TO RELATED APPLICATIONS

This application is a National Stage of International Application PCT/EP2010/057752, filed Jun. 2, 2010, which claims priority to both European Patent Application No. 09162228.2, filed Jun. 9, 2009, and U.S. Provisional Patent Application 61/186,251, filed Jun. 11, 2009.

TECHNICAL FIELD

The invention disclosed herein generally relates to video processing, and more precisely relates to continuous detection of undesired temporal variations in a sequence of video frames. In particular, the invention is suitable for detection of aliasing-related artefacts in a sequence of video frames which is being streamed over a communications network. Advantageously, the invention further provides a method and device for combined detection and suppression of undesired temporal variations.

BACKGROUND

During playback of moving images—that is, the sequential presentation at appropriate points in time of a sequence of still images (frames)—a viewer may sometimes observe an undesired brightness variation, 'flicker', which was not present in the depicted scene. As used herein, a scene is a region of space which is visible or partially visible in the field of view of an imaging apparatus for recording moving images. Although the whole scene may not be visible at a given moment, it can be covered successively during a shot by panning Flicker may be caused by a light source having intensity oscillations that are fast enough to be imperceptible to the human eye. However, the recording includes sampling, at the frame rate of the imaging apparatus, of this oscillation frequency, which may give rise to a lower, visibly perceptible frequency through the process of sampling. FIG. 1 illustrates how samples (shown as circles) of a high-frequency signal can be interpreted as coming from a low-frequency signal and vice versa; this phenomenon is referred to as aliasing.

One may distinguish different kinds of flicker. In a gray-scale video sequence, flicker is an unintentional—and usually periodic—variation of the single channel of the image signal. Such variation may affect the whole frame or only a sub-region, which may correspond to a region of space having a particular illumination. When colour video technology is used, an oscillating white light source may affect the recorded video sequence in a different way than an oscillating coloured light source. As will be explained in the next few paragraphs, the precise interpretation of flicker in terms of image components depends on the precise colour video format used.

Firstly, if the video sequence is encoded in terms of linear primary colour components, such as RGB, the undesired oscillation will be present in all components in the case of a white light source. If the oscillating light source is coloured, it will contribute an oscillating term to each colour component in proportion to the composition of the colour of the light source; for example, an oscillating red light source will contribute predominantly to the R component of an RGB signal and less to the G and B components.

Secondly, several widespread colour video formats are based on a three-dimensional YCbCr colour space. Such a video format comprises one luma channel Y (encoding the luminance component, or brightness, of a pixel) and two chroma channels Cb, Cr (encoding the chrominance components of a pixel in terms of the deviation from white). The luma component corresponds to the single image channel of gray-scale video; hence if a YCbCr colour video signal is to be reproduced by a gray-scale receiver, then channels Cb, Cr can simply be ignored. The precise definition of the image components (as regards constants, scaling, offset etc.) may vary between different particular video formats, but generally there exists an unambiguous transformation (sometimes a linear transformation) between a primary colour format and a YCbCr format. Especially, all three primary-colour components make a positive contribution to the luminance, such as via the linear relationship $Y=\rho R+\gamma G+\beta B$, wherein the relative values of coefficients $\rho>0$, $\gamma>0$, $\beta>0$ have been determined in accordance with a standard white colour. Thus, whether the light source causing flicker is white or coloured, the flicker will manifest itself as a variation in the luminance component. On the other hand, a coloured light source may also cause oscillation of the Cb and/or the Cr component.

Thirdly, there exist further colour video formats based on the triple of hue, saturation and lightness, notably the HSL, HSV, HLS, HIS and HSB formats. Generally, a transformation to and from the RGB format accompanies each video format of this kind. Flicker, at least white flicker, will be detectable in the lightness/value/brightness/intensity channel (L or V), which will not be distinguished from luminance in the rest of this disclosure.

The discussion in the previous paragraphs intentionally does not distinguish between analogue and digital formats since, for the purposes of this disclosure, the latter may be regarded as quantised versions of the former. Likewise, some video formats may exist in a gamma-compressed or partially gamma-compressed version, such as the R'G'B' and the Y'CbCr formats, in addition to the linear version. However, it is immaterial for the understanding of the present invention whether the video format includes such compression.

Because viewers may find flicker disturbing or unpleasant, there has been an interest in the field of video processing in detecting and correcting it. As regards detection, many state-of-the-art methods are based on the Fourier transformation, which decomposes a signal into a linear combination of components having different frequencies including zero. On the basis of the relative importance of different frequencies (as expressed by the Fourier coefficients) it can be established whether flicker is present or not. A detection method according to this principle is shown in EP 1 324 598; this method includes discrete Fourier transformation of averages of the image signals. As recognised by those skilled in the art of signal processing, algorithms involving Fourier transformation have the following drawbacks:

they cannot be applied to non-stationary signals, such as video signals in which the frame rate may vary over time due to non-equidistant sampling;
  they do not resolve non-sinusoidal flicker in a signal well, since the energy of the fundamental frequency is in part lost to higher harmonics; and
  they may be computationally complex.

Other approaches to detection may be based on computing the statistical variance. For example, the method disclosed in US 2007/036213 applies a lower threshold condition on the variance in order to determine when flicker reduction is necessary. Partly because an increase in variance can have other sources than flicker, such detection methods are known to produce a large percentage of false alarms.

Several available methods for suppressing or removing flicker are based on correction of each frame in a flickering sequence against a reference frame. More precisely, a cumulative distribution function (CDF) or, by another name, a cumulative histogram is generated for the frame to be corrected and a reference CDF is generated for the reference frame. The pixel values are then adjusted in order that the CDF for the corrected frame is approximately equal to that of the reference frame. In general, it is not necessary for the reference frame to be identical (apart from the brightening or darkening caused by flicker) to the frame to be corrected, but it should preferably depict a similar scene with respect to background, lighting, etc. The method disclosed in U.S. Pat. No. 5,793,886 provides a representative example. To generate the reference CDF, the method computes CDFs for both an earlier and a later frame in the sequence, and then interpolates these in accordance with the position of the frame which is to be corrected.

With consumers' increased access to wideband Internet connections, not only voice-over-IP technology but also video calls and video conferencing have proliferated in recent years. Since audio and video data are here transmitted as a stream of packets, both the sending and the receiving party are required to handle the data on a real-time basis and not as finite batches. Annoying image flicker may occur in video calls just as in any kind of moving images, but available methods (see above) for detecting and resolving flicker are often ill-suited. Most importantly, many existing methods—besides the one referred to above—necessitate knowledge of both preceding and subsequent frames in the stream. Such non-causal processing methods cannot be applied to the real-time case without buffering frames, which delays transmission of the data stream. The least buffer length is the maximal expected duration of a flickering portion of the video sequence plus the processing (correction) time per frame plus one reference frame at the end of the flickering portion. In the case of state-of-the-art Internet communications, in which a certain delay for concealing network jitter already exists, most users would find an additional delay to be unacceptable. Therefore, buffering would imply a significant drawback.

While means for detecting and/or suppressing image flicker in live broadcasting are known in the art, most such devices cannot be integrated in consumer products because of their high degree of sophistication. Similarly, methods directed to reducing flicker during recording may presuppose access to advanced optical hardware, such as adaptive image sensors and shutter arrangements susceptible of being regulated. A provider of, e.g., video call services cannot presume that such hardware features are available, but is forced to accept image data from whatever devices the users of the service operate. Finally, the sheer complexity of certain methods make them inapplicable to video calls. On a personal computer under normal load, a reasonably accurate Fourier-based detection method may engage an inconveniently large portion of the CPU capacity; at least, computationally complex methods imply a risk of forcing the video call system into making an ad hoc quality reduction, such as a drop in frame rate, a reduction of image size etc.

SUMMARY

In view of the drawbacks of available technology for detecting and suppressing undesired temporal variations, it is an object of the present invention to provide an alternative technique for detection (and advantageously, suppression) of such variations that suffers to a lesser extent from these drawbacks, especially when executed in real time.

Thus, in accordance with a first aspect, the invention provides the method of claim 1 for detection of undesired temporal variations in a sequence of video frames. According to a second aspect, as set forth in claim 3, there is provided a device (video frame receiver) for detection of undesired temporal variations. As defined in claim 16, in accordance with a third aspect of the invention, there is provided a computer-program product for detection of undesired temporal variations.

As one skilled in the art will appreciate when studying the independent claims, detection according to the inventive idea and embodiments thereof includes:

- A variable, which depends on the luminance of pixels in a frame at a time, is evaluated at regular time intervals. The values form a time sequence of the variable. Suitably, the evaluation is carried out on the basis of a sub-set of the pixels in each frame, which usually provides sufficient accuracy of the detection. The set of pixels used for evaluating the variable may be invariant between frames. However, the liberty in selecting the pixels belonging to this set may also be advantageously used to prevent outliers (pixels having values that are numerically distant from the rest of the data) from contributing to the variable, which could cause false detection.
- A variation frequency of the global luminance is estimated on the basis of the time sequence of the variable. For instance, if the variable is proportional to the global luminance of a frame, then an oscillation of the time sequence of the variable will have the same frequency as the global luminance over consecutive frames.
- It is assessed whether the estimate of the variation frequency of the global luminance is close to any expected variation frequency, that is, whether it differs from any such expected variation frequency by less than a predetermined tolerance.

If the last condition is found to be fulfilled, then an undesired temporal luminance variation in the video sequence is detected.

The inventive idea, when embodied as a detection algorithm, a detector or the like, provides robustness in so far as its sensitivity can be accurately tuned by varying the tolerance, so that the detection is neither overly tolerant nor too strict. Detection according to the invention is computationally economical and suited for being implemented as a real-time video processing component, notably in connection with an Internet-based video call system handling streamed video data. The complexity and hardware requirements, such as memory space, can be further decreased if the implementation exploits the consecutive character of the method, which may involve recovering previously computed values in the time sequence and the like.

The variable referred to above may be a frame mean that gives equal weight to the luminance of all pixels or may be a weighted mean. In embodiments of the invention as a device for detecting undesired temporal luminance variations, the functional section for evaluating the variable is referred to as a frame averager whether the variable is a (weighted) mean or not.

The variable referred to above is suitable for estimating a global luminance variation frequency and not primarily for estimating a local luminance variation. A global luminance variation may manifest itself as an overall brightness fluctuation over time in a frame sequence. In contrast hereto, a local luminance variation may be seen as a spatial brightness fluctuation in a frame, such as a line-wise variation (line flicker). To estimate a variation frequency of the global luminance variation, it may be suitable to compute the brightness average over a whole frame or over a representative portion of a frame, as discussed in other parts of this disclosure.

As an optional feature of the invention, the variation frequency is estimated by counting how often the time sequence of the variable intersects a reference level per unit time; the number of crossings divided by the duration of the sequence is an estimate of the variation frequency of the global luminance. The exact value of the reference level is not very important provided the intersection count captures a possible oscillating behaviour of the frame means. For example, the reference level may be chosen as a global mean, that is, an average taken over the latest few values in the time sequence. Advantageously, the count of intersections of the time sequence and the reference level (alternatively, the count of zero crossings of the time sequence minus the reference level) can be made more reliable by defining a latency zone around the global mean (respectively, around zero). A value in the time sequence that is closer to the reference level than a second tolerance is considered unreliable and its possible contribution to the count is ignored. Instead, the next entry in the time sequence is considered. This way, the method or device according to the invention is less sensitive to the influence of inaccurate measurements, which could otherwise lead to an incorrect detection result.

As a further optional feature of the invention, which may be used alone or in combination with other optional features, a value of the frame rate—the frequency at which the images are acquired—and a value of an illumination frequency are determined. The expected variation frequency is determined on the basis of the two frequencies. Here, the illumination frequency relates to the luminance of an object or surface visible in the video sequence. If this luminance is variable and (quasi)periodic, the illumination frequency is non-zero. Examples of objects having periodically variable luminance include fluorescent light sources and articles illuminated by these. As a generalisation of this idea, multiple illumination frequencies may be used. It is emphasised that the claimed method is also applicable to a video sequence having a variable frame rate. Therefore, the method should determine the expected variation frequency on the basis of an actual value of the frame rate, such as a local mean frame rate over the interval in which zero crossings are counted. It is moreover noted that the method may equivalently take the measured variation frequency as its starting point and determine, based thereon, what possible illumination frequencies may have generated it; it is then assessed whether the actual illumination frequency differs from any of these by less than the tolerance. As already pointed out in the previous section, the lightness (or brightness or value or intensity) channel in HSL and similar image formats is equivalent, for the purposes of this disclosure, to the luma channel.

The expected variation frequency may be computed as a frequency component resulting from aliasing of the illumination frequency $f_i$ with respect to the frame rate $f_s$. All aliased frequency components are then given by $|f_i - N f_s|$ for integer $N$. Taking into account that the aliased frequency component must be visible during playback at the frame rate (i.e., by the Nyquist criterion, it must be less than half the frame rate), $N$ must fulfil the following condition:

$$\frac{f_i}{f_s} - \frac{1}{2} < N < \frac{f_i}{f_s} + \frac{1}{2}. \tag{1}$$

An integer multiple of the electric mains frequency may be used as the illumination frequency. Indeed, the intensity of most available AC-driven fluorescent lighting devices oscillates with a frequency which is the frequency of their driving current or the double of this frequency. This may imply that a dedicated measurement of the illumination frequency is not needed. The apparatus performing the inventive method may in fact be powered at the same electric mains frequency, which then makes the determination of the illumination frequency (or frequencies, if several multiples of the mains frequency are being used) very simple.

The inventors have identified several flaws of available CDF-based flicker suppression methods and devices, in particular:

Use of a single frame for generating the reference CDF may be an error-sensitive approach; for instance, the luminance distribution of the reference frame may deviate from the normal luminance distribution because of an intentional variation, such as a fade to black.

In frames which have been brightened under the action of image flicker, a number of pixels may be saturated and thus truncated down to the maximal admissible value of the coding format. Since the true values of the saturated pixels have been lost in truncation, a straightforward CDF-based correction may lead to a visible luminance edge between the previously saturated pixels and the next brightest level after correction.

Round-off errors in the course of pixel-value corrections may sometimes be detrimental to the quality of the corrected image.

Therefore, to improve at least some of these shortcomings, a particular embodiment of the invention provides combined detection and suppression of undesired temporal variations in a sequence of video frames. In case of a positive detection of an undesired temporal image variation, there follows:

A set of frames to be corrected is selected.

For each frame in the selected set of frames, the following is performed:

A CDF is generated for actual values in the set of pixels (the set of pixels which was used for computing luminance means) of at least one image component (such as the luminance or a primary colour, encoded linearly or via gamma compression) in each frame of the set.

A reference CDF is generated on the basis of CDFs for values of the same image component in earlier frames.

For each pixel and each of said at least one image component, determining a corrected value, which minimises a difference between a CDF reading for the actual value (the probability of randomly picking a pixel in the uncorrected frame having a value less than or equal to the actual value) and a reference-CDF reading for the corrected value (the probability of randomly picking a pixel in the corrected frame having a value less than or equal to the corrected value, i.e., the now actual value). The above steps of generating a CDF, generating a reference CDF and replacing are to be performed for each image component needing detection, e.g., for each primary colour of the image format. (It is noted that not any image component in any image format is suited for being corrected by the inventive method. For instance, the hue component (H) of the HSL format is an angular measure, for which it is not clear how a CDF is to be defined. Although detection according to the invention can be performed with respect to the lightness channel, it is advisable to convert each frame into, e.g., YCbCr format before correction is executed. The corrected frames may then be converted back to HSL format.)

Both detection and correction as set forth above may be applied to a restricted sequence of frames formed by restricting each frame in the video sequence to a fixed sub-region. The set of frames to be corrected may be a portion of the video sequence in which flicker is present according to the detection. The values on which to base the reference CDF may advantageously be provided by a low-pass-type filter, such as a weighted or non-weighted moving average (MA) or an autoregressive (AR) filter.

In mathematical formalism, the replacing of values can be expressed as follows: the actual value $x_{curr}$ of the image component in a pixel is replaced by the corrected value $x_{corr}$, which is that (admissible) value which minimises $|F(x_{curr}) - F_{ref}(x_{corr})|$, where F is the CDF of the frame and $F_{ref}$ is the reference CDF. This formulation is suitable both for analogue and digital encoding, for in some digital formats, only integer numbers are admissible as pixel values. If any pixel value is allowed, the corrected value may be defined as $$x_{corr} = F_{ref}^{-1}(F(x_{curr})) \qquad (2)$$

Detection and suppression according to this embodiment of the invention suffers less from the drawbacks of available art, as outlined above. In particular, basing the reference CDF on a value obtained by low-pass filtering of CDFs for preceding frames decreases the risk of inadequate correction due to intentional luminance variations in the video sequence. Because a frame can be processed although the subsequent frames are yet unknown, the combined detection and suppression provided by the invention fulfils the causality requirement, which is necessary for its applicability to streamed media, such as transmission over the Internet of a video sequence recorded in real time.

As an optional feature of the invention, the corrector may be adapted to supplement the values of the reference CDF by interpolated values. As an example, suppose the reference CDF comprises values (150, 0.60) and (152, 0.68) and a pixel value of 170, corresponding to the CDF value (170, 0.62), is to be corrected. The corrector having this optional feature may then replace 170 by 150.5, which would correspond to the interpolated reference-CDF value (150.5, 0.62). More advanced interpolation procedures, such as quadratic or cubic interpolation, possibly including more than two points, may also be used to advantage.

Preferably, in order to decrease round-off errors and to make the flicker suppression less error-sensitive, the reference CDF may be up-sampled and smoothened before it is used for determining corrected values for pixels in a frame to be corrected.

As another optional feature of the invention, the reference CDF may be based on an average over frames preceding the flickering portion of the video sequence, that is, frames preceding the earliest frame in the selected set of frames to be corrected. Hence, flickering frames do not contribute to the reference CDF, which can therefore be expected to be more reliable.

A final optional feature mitigates a possible inconvenience associated with CDF-based flicker suppression in brightened frames which contain saturated pixels, that is, pixels whose value is the maximal admissible value. For such pixels, the brightening by flicker would in principle have led to values greater than the maximal one, but truncation (due to both image sensor limitations and adaptation to the image format) takes it down to the maximal value, which causes an information loss. In this condition, there is a concealed interval between this maximal value (for which the CDF reading is 1) and the inverse value under the reference CDF of the next highest cumulated probability attained by the CDF. The interval is concealed in the sense that no corrected values will lie in it. Actual pixel values which are close to the maximal admissible value (for which the CDF will be much less than 1) will then be replaced by corrected values much below the maximal admissible value, resulting in a potentially visible edge in the corrected frame. To make such edge less visible, the corrected values are scaled up by a multiplicative brightening factor.

The brightening factor may be determined in accordance with the variation amplitude of the time sequence of the variable, especially of the frame means of the luminance. The variation amplitude can be determined, e.g., in connection with the estimation of the variation frequency. It may be not be necessary to update the value of the brightening factor for every frame. A greater variation amplitude will result in a greater brightening factor. The brightened values may not exceed the maximal admissible value of the encoding format and are therefore truncated to the maximal admissible value if needed; this should rarely be necessary if the value of the brightening factor is suitably chosen, with the obvious exception for those pixel values which are already maximal and hence cannot be brightened. It is noted for the sake of completeness that the brightened values may need to be rounded off to the value set, e.g., integers, used in the encoding format. As a result of the brightening, the difference between saturated pixels (having the maximal admissible value) and the brightest non-saturated pixels is decreased.

BRIEF DESCRIPTION OF THE DRAWINGS

The invention will now be further elucidated with reference to the accompanying drawings, on which.

DETAILED DESCRIPTION

Particular embodiments of the present invention will now be described. The invention may, however, be embodied in many different forms and should not be construed as being limited to the embodiments set forth herein; rather, these embodiments are provided by way of example so that this disclosure will be thorough and complete, and will fully convey the scope of the invention to those skilled in the art.

The invention can be embodied as a video frame receiver with detection capabilities. The receiver includes a first section (frame averager) for evaluating a variable which is based on the luminance. Preferably, the variable is a sum of the luminance values of a set of pixels in each frame. The evaluation takes place at regular time intervals and so, at time sequence of the variable is obtained. The receiver further includes a frequency estimator adapted to receive the time sequence of the variable and to estimate based thereon the variation frequency of the global luminance. Finally, the receiver is provided with a comparator for determining whether the estimate of the variation frequency of the global luminance differs from any expected variation frequency by less than a tolerance. This simple receiver can be extended by further functional sections selected from those described below or variants thereof.

Figure 4:
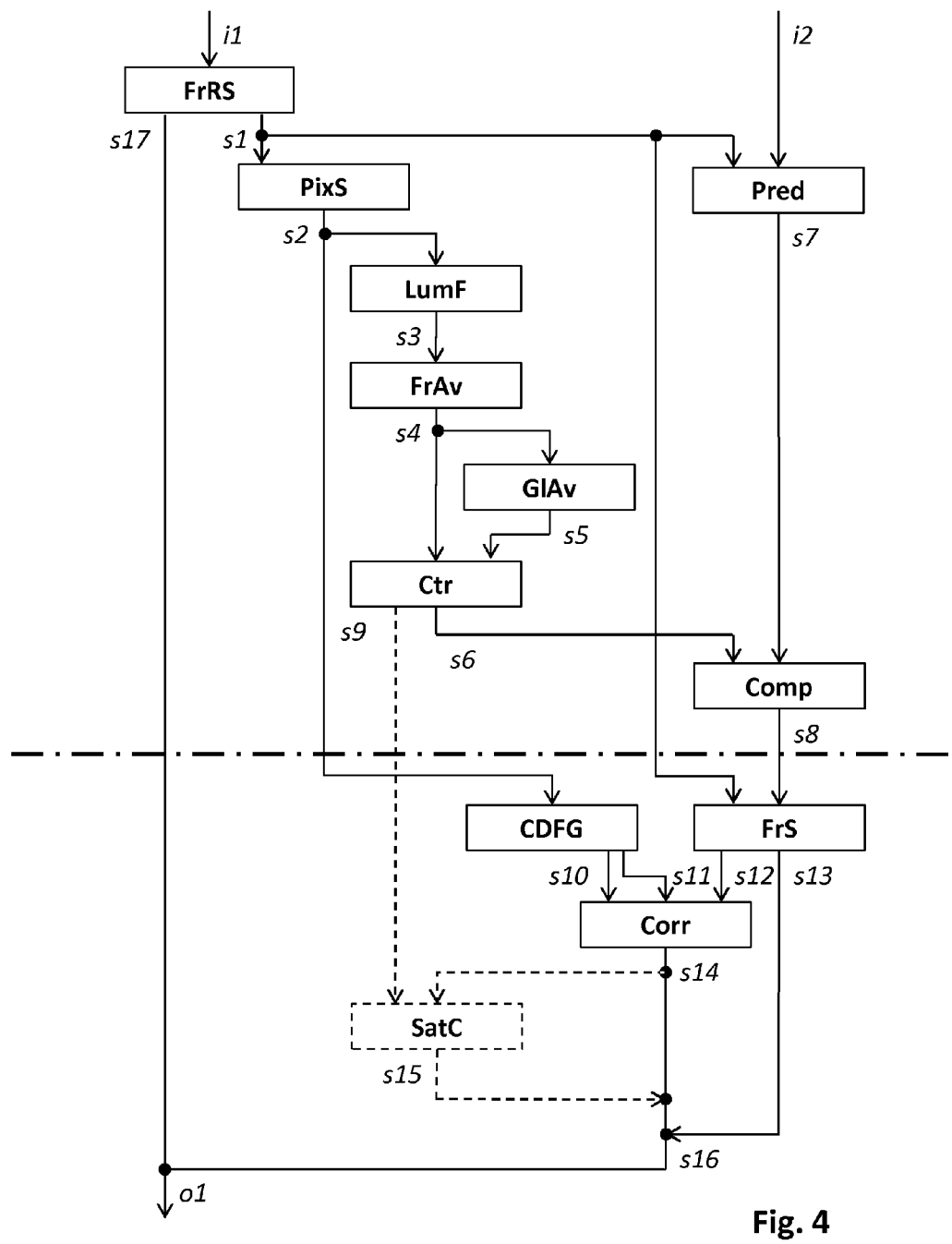
FIG. 4 is a schematic drawing of a device for detection and correction of undesired temporal variations in a sequence of video images, according to an embodiment of the invention.

FIG. 4 is a diagrammatic drawing of a device for detection and correction of undesired temporal variations in a video frame sequence, in accordance with another embodiment of the invention. Generally, the functional sections (represented as framed boldface text in FIG. 4) do not necessarily refer to physically separate entities; at least some of the functional sections may be combined into multi-functional sections, or may even be embodied as computer-executable instructions. It is further noted that an intersection of circuit lines on the drawing does not represent an electric or communicative connection unless indicated so by a dot. As shown by the horizontal dash-dotted line, the device comprises a detection section and a correction section in cooperation therewith, represented above and below the dash-dotted line, respectively. The symbols used in FIG. 4 are explained in table 1 below.

TABLE 1

Symbols used in FIG. 4

Functional sections

| | |
|---|---|
| CDFG | CDF and reference-CDF generator |
| Comp | comparator |
| Corr | corrector |
| Ctr | counter |
| FrAv | frame averager |
| FrRS | frame region selector |
| FrS | frame selector |
| GlAv | global averager |
| LumF | luminance filter |
| PixS | pixel selector |
| Pred | predictor |
| SatC | saturation compensator |

Significance of signals

| | |
|---|---|
| i1 | frames, optionally time-stamped |
| i2 | illumination frequency |
| s1 | frames restricted to region for detection (and correction) |
| s2 | frames restricted to region for detection (and correction), further restricted to set of pixels for detection |
| s3 | luminance component of s2 |
| s4 | frame means of s3 |
| s5 | global mean of s4 |
| s6 | number of crossings of s4 with respect to s5 per unit time |
| s7 | expected variation frequency |
| s8 | result of detection |
| s9 | amplitude of variation of s4 |
| s10 | actual CDF |
| s11 | reference CDF |
| s12 | set of frames to be corrected, restricted to region for detection and correction |
| s13 | frames not to be corrected, restricted to region for detection and correction |
| s14 | set of frames to be corrected, restricted to region for detection and correction, after correction |
| s15 | set of frames to be corrected, restricted to region for detection and correction, after correction and saturation compensation |
| s16 | all frames, after detection and correction, restricted to region for detection (and correction) |
| s17 | frames restricted to complement of region for detection (and correction) |
| o1 | frames after detection and correction |

Input signals i1, i2 to the device represent, respectively, a (time-stamped) video frame sequence and an illumination frequency. The output signal o encodes the video frame sequence after detection and, if needed, correction. Input to and output from the device may take place via network interfaces or packet-switched gateways. For instance, the device may be arranged as part of a transmission link over a communications network, so that a video sequence can be processed in real time while it is being transmitted by streaming.

The sequence i1 of frames is received by a frame region selector FrRS, which forms one sequence s1 of frames restricted to a region selected for detection (and possibly correction) and one sequence s17 of frames restricted to the complement of the selected region. By restricting the frame region on which the device operates, the computational load on the device can sometimes be decreased without any inconvenience. For instance, letter boxing (i.e., screening of the top and bottom portion of the image by black strips) is common practice for transferring a video shot in a widescreen aspect ratio into a less elongated aspect ratio, and clearly, flicker is unlikely to occur in the black strips. If no such frame-region restriction is made, then s1 is a sequence of the entire frames and s17 is void.

Signal s1 is fed to a pixel selector PixS, in which each frame is further restricted to a set of pixels for detection, which set is (in this embodiment) invariable between frames, and encoded as signal s2. This step can be viewed as a subsampling of the signal. The benefit is a decrease of the quantity of data to be processed, for usually enough information for a reliable detection of undesired temporal variations is contained in a subset of the pixels. To mention two examples, the set of pixels may be a randomly selected collection of single pixels, or may be every $n^{th}$ pixel in some enumeration of the pixels in the frame region. Here, n is an integer number for which suitable values may vary between embodiments aimed at different purposes. Having studied and understood this specification, the skilled person will be able to determine a suitable n value by routine experimentation.

Signal s2 is forwarded to a luminance filter LumF, which allows the luminance component s3 of signal s2 to pass. A frame averager FrAv computes a sequence of averages of signal s3. In this disclosure, such average over one frame is referred to as a frame mean, and the time sequence of frame means is encoded as signal s4. In other words, in this embodiment the variable whose values form the time sequence is the luminance mean of the pixels in one frame. After that, a global averager GlAv computes, as a moving average or by an autoregressive filter, a global mean s5 of the sequence of frame means s4. (Here, the term 'global' does not imply that the mean is taken over all available frames, merely over more than one frame.) Signals s4 and s5 are provided to a counter Ctr, which computes the number of crossings of signal s4 with respect to signal s5 per unit time. Thus, the counter Ctr uses the global mean s5 as the reference level. In this embodiment, the counter Ctr functions on a moving-average basis, so that the number of crossings per unit time is more precisely a mean number of crossings per unit time over a time interval. This quantity is output from the counter Ctr as an estimated variation frequency s6. If the frame rate is constant in the video sequence, then the extent of the time interval is simply the number of frames (before possible omission of values in the latency zone; see next paragraph) divided by the frame rate. In the case of a variable frame rate, the time extent may be determined by retrieving time stamps, if such are included in the video format, of the first and last frames of the interval. The interval may coincide with that used for computing the global mean of frame means.

Figure 1:
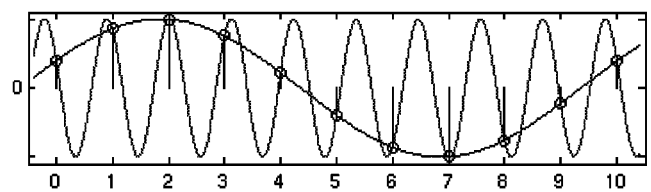
FIG. 1 illustrates frequency aliasing.
Figure 2:
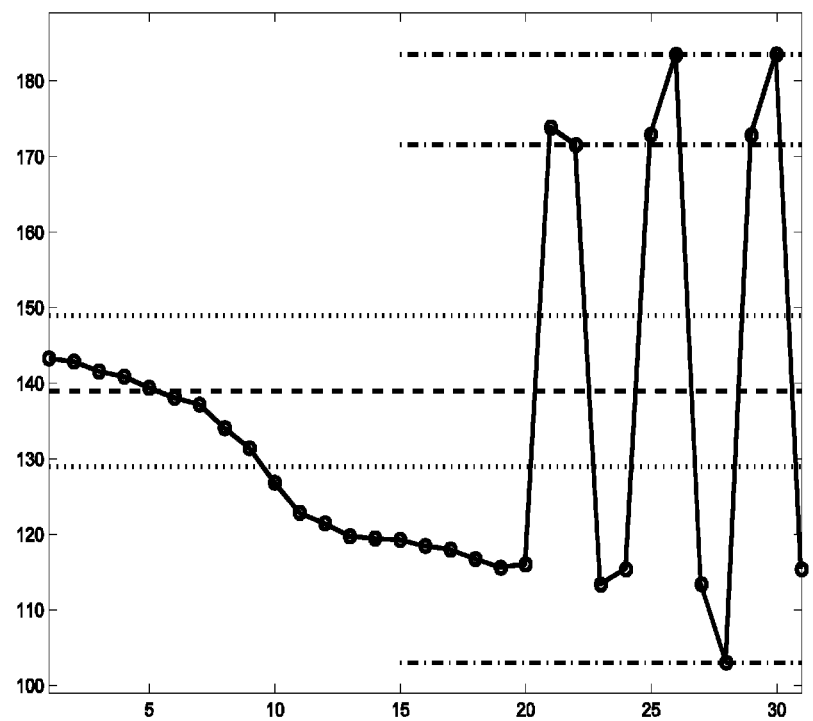
FIG. 2 is a graphical representation of an oscillating sequence of frame luminance means.

FIG. 2 is a plot of a sequence of 31 frame means (solid curve with circles) and a global mean of these (horizontal dashed line at an ordinate value of approximately 139). Samples nos. 1-20 do not have an oscillatory behaviour but exhibit a decreasing tendency, which may be the result of an intentional decrease of the mean luminance, such as a fade to black or a pan into a darker area. The frame means sequence certainly crosses the global mean once, but the signal is clearly not periodic. The sequence of samples nos. 20-31 cross the global mean six times, and it is noted that the crossings occur at approximately equal intervals (about 2 samples apart, implying that the frequency is the inverse of the time extent of 4 samples) and with a fairly stable amplitude (about 40 units). Contrasting the two sets of samples, a luminance variation seems to be present in the later set but not in the earlier. The counting of frame mean/global mean crossings is made more robust against measurement noise by introducing a latency zone around the global mean. As shown by the two dotted horizontal lines in FIG. 2, such latency zone may for example consist of ordinate values between 129 and 149, corresponding to a second tolerance being equal to 10 units. The benefit is that crossings are not counted with respect to the global mean itself but with respect to the latency zone. Put differently, values lying in the latency zone are not allowed to contribute to the crossings count. This way, depending on the extent of the latency zone, it is less likely that an erroneous frame mean—one having slid over to an incorrect side of the global mean by a measurement error, thereby possibly causing an error of ±2 to the crossings count—corrupts the output of the counter Ctr.

With reference to FIG. 4 again, a predictor Pred, provided parallel to the pixel selector PixS, receives signal s1, from which the predictor Pred derives an actual value of the frame rate $f_s$. The frame rate can be derived, e.g., by studying the difference of consecutive time stamps if such are provided. The predictor Pred further receives a signal i2 indicative of the illumination frequency $f_i$, w. The illumination frequency was discussed in previous sections of the present application; notably, it may be a multiple of an electric mains frequency. Using the formula $|f_i - Nf_s|$, where N is an integer satisfying condition (1) above, the predictor computes the expected variation frequency s7 and releases this as output.

A comparator Comp receives both the expected variation frequency s7 and the (actual) estimated variation frequency s6. The comparator Comp assesses whether this is within a predetermined tolerance, the choice of tolerance being based on a weighing of reliability (fewer false alarms) against sensitivity. If it is within the predetermined tolerance, a positive Boolean signal is provided as detection result s8; otherwise a negative Boolean signal is provided as result s8. The detection is complete.

Figure 3:
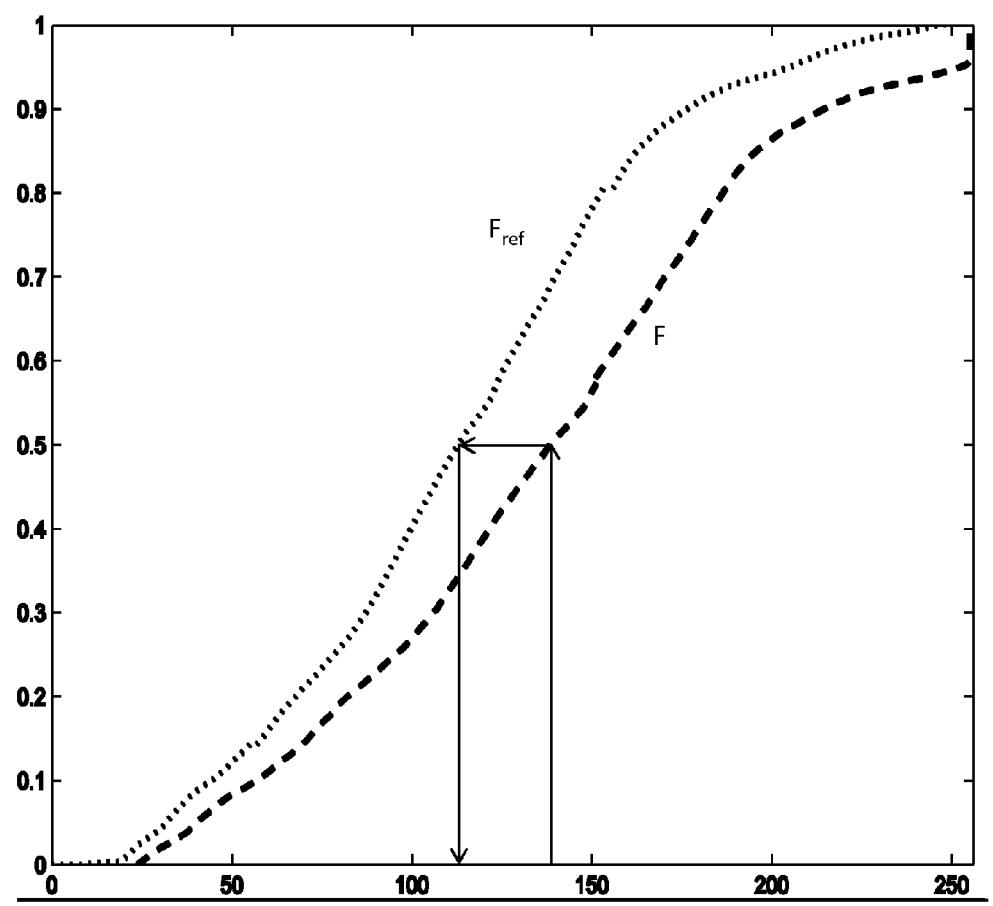
FIG. 3 illustrates a step of replacing pixel values in a correction method according to the invention.

The correction section of the device in FIG. 4, below the dash-dotted horizontal line, will now be addressed. Responsive to a positive detection result s8, frame selector FrS is adapted to separate the frames (still restricted to a frame region for detection and correction) represented by signal s1, which is provided to the frame selector FrS, into one sequence of frames to be corrected s12 and one sequence of frames not to be corrected s13. The latter frames s13 do not undergo any further treatment, whereas the former s12 are provided to a corrector Corr. An uninterrupted sequence of frames deemed to need correction will be referred to below as a flicker episode. Some of the quantitative characteristics of the processing executed by the corrector Corr are determined by reference CDF s11, which is based on (e.g., low-pass-filtered, particularly averaged) values of previous CDFs, and by an actual CDF s10 of each frame to be corrected. All CDFs are computed by a CDF generator CDFG, which receives signal s2 (frames restricted to region for detection and correction, further restricted to set of pixels for detection). Hence, if the set of pixels for detection is not the whole frame or frame region, both CDFs may be based on sub-sampled data, although the correction step is applied to each entire frame or frame region, which is computationally economical. The correction process carried out by the corrector Corr has been described in detail in the Summary section: the actual value $x_{curr}$ of the image component in a pixel is replaced by the corrected value $x_{corr}$, which is that (admissible) value which minimises $|F(x_{curr}) - F_{ref}(x_{corr})|$, where F is the CDF of the frame and $F_{ref}$ is the reference CDF, which is generated on the basis of CDFs of earlier frames. The process is visualised by FIG. 3, the sub-steps being shown by the sequence of arrows for the exemplary actual pixel value 139:

1. the actual CDF (F) is read for the pixel value 139, and its cumulated probability (the probability of picking a pixel having a value ≤139) is found to be 0.50;
2. the point on the reference CDF ($F_{ref}$) having this cumulated probability is retrieved; and
3. the corresponding pixel value, 113, is the corrected value, with which the actual pixel value is replaced.

In connection with this exemplary embodiment, it is noted that it is may be expedient to buffer CDFs for single video frames. Thus, if an undesired temporal variation has been detected, probably more than the latest frame will be selected for correction by the frame selector FrS, and the need for re-computing an actual CDF for each of the next latest, third latest, fourth latest etc. frames is avoided if a number of these CDFs are buffered in the memory of the CDF generator CDFG.

The corrected frames s14, which are returned by the corrector Corr, may be directly merged with the frames not to be corrected s13, encoded as signal s16. The frames encoded as signal s16 are subsequently merged frame-wise with the frames restricted to the complement of the frame region for correction s17, thereby forming the output signal of of the device.

In an alternative embodiment, however, the corrected frames s14 are not directly merged with the frames not to be corrected s13, but are further processed by a saturation compensator SatC in order to compensate possible saturation of pixels. After compensation, the output s15 of the saturation compensator SatC is combined with signal s13 into signal s16.

Figure 5:
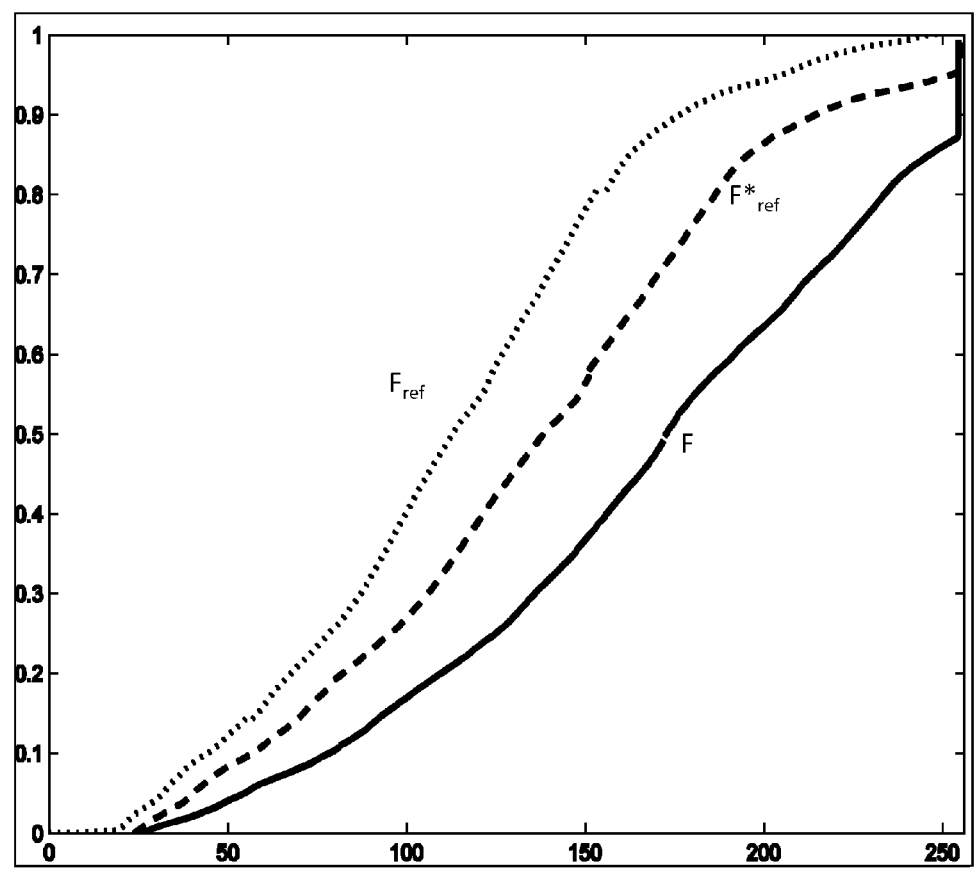
FIG. 5 is a plot of three cumulative distribution functions.
Figure 6:
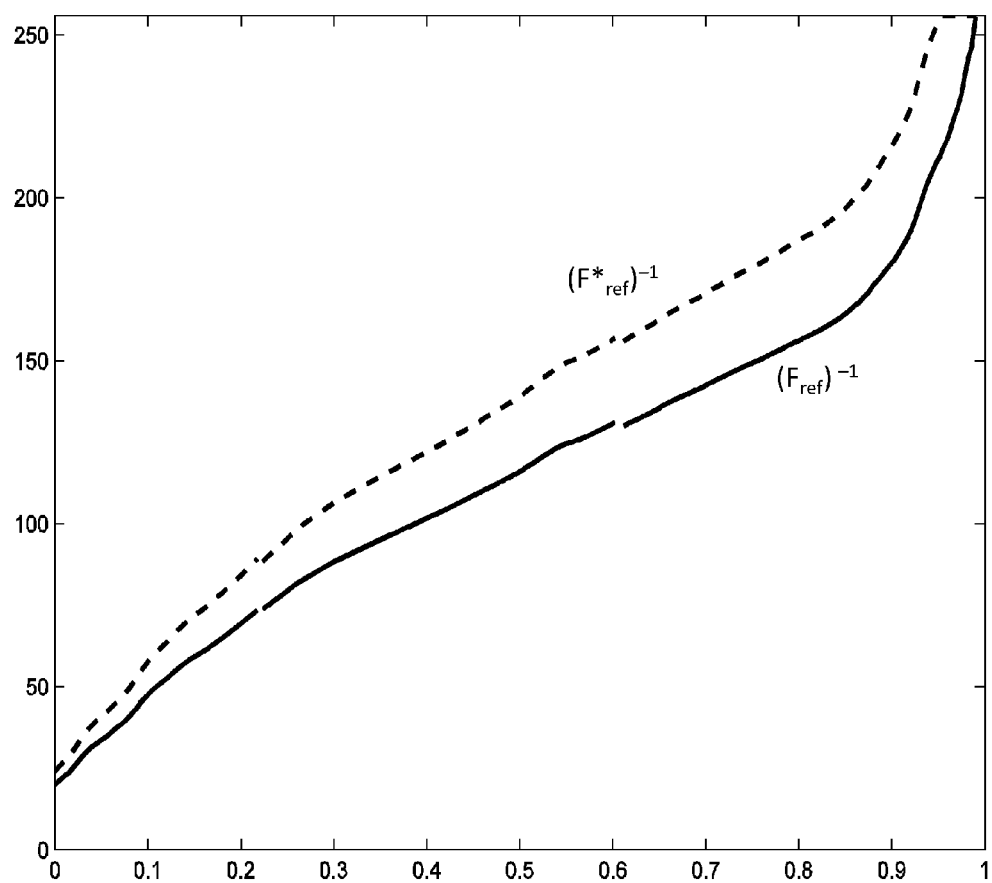
FIG. 6 is a plot of two inverse cumulative distribution functions.

What causes saturation, as well as its associated inconveniences, has been outlined above. Saturation is remedied according to the invention by brightening the corrected values. Referring to FIG. 5, more particularly, the brightening can be expressed in that a brightened reference CDF (indicated by $F_{ref}*$) is used in place of the reference CDF (indicated by $F_{ref}$). In the exemplary situation of FIG. 5, it can be deduced from the reference CDF that half of the pixels have values >113, whereas by the brightened reference CDF, half of the pixels are >139. Thus, following the actual CDF (F), pixel value 173 would not be replaced by 113, but by 139, which is α=23% brighter. The benefit can be seen by comparing the concealed interval for the reference CDF and for the brightened reference CDF: for the next greatest luminance value (in 8-bit coding) 254, F(254)=0.87. This equals $F_{ref}(167)$ and $F_{ref}*(205)$, for 205=1.23 qual. Hence, the concealed interval shrinks from [168, 254] to [206, 254], and the edge height decreases from 86 to 48. With reference to equation 2 above, the process of replacing pixel values can be described as follows:

$$x_{corr}* = (F_{ref}*)^{-1}(F(x_{curr})) \qquad (2')$$

where $(F_{ref}*)^{-1} = \min\{(1+\alpha)F_{ref}^{-1}, ICMAX\}$ and ICMAX is the maximal admissible luminance value. In this exemplary case of 8-bit binary coding, ICMAX=255. FIG. 6 is a graphical comparison of an inverse reference CDF and the inverse of a brightened CDF. The rightmost portion of the latter curve is flat because of the truncation to ICMAX.

The brightening factor α can be a fixed number found by routine experimentation on representative sample images. It can also be determined dynamically for each frame to be corrected—or preferably for each flicker episode to be corrected—on the basis of a variation amplitude of the image component which is currently subject to correction, such as a primary colour component. In embodiments where an approximate value is considered satisfactory, the luminance can be used in place of the actual image component for determining the brightening factor. For instance, the brightening factor α can be calculated as follows:

$$\alpha = \frac{\min_{t \in B} y(t) + \zeta \times (\max_{t \in B} y(t) - \min_{tin} y(t))}{y(t_{ref})} - 1, \quad (3)$$

where y(t) is the buffered frame mean of the image component under correction at time t, B is the set of points in time for which a buffered frame mean of the image component exists, ζ is a tuning parameter and $y(t_{ref})$ is a reference value in the buffer. The reference value may, for instance, be the oldest value or the middle value. In FIG. 2, B=[0, 31], $\min_{tin}y(t)=103$ and $\max_{t \in B}y(t)=184$. Using $t_{ref}=0$ and ζ=1.03, one obtains:

$$\alpha = \frac{103 + 1.03 tains.\ va}{144} - 1 = 29\%. \quad (4)$$

This α value is used for brightening frames up to the end of the flicker episode, that is, as long as correction of pixel values takes place. Clearly, equation (3) determines the brightening factor α in accordance with the difference between the brightest and the darkest frames during flicker. The influence of this difference is proportional to the value of the tuning parameter ζ.

As already noted, the brightening factor may be determined on the basis of the variation of frame means of another image component than that currently under correction, such as the luminance. In the device depicted in FIG. 4, the counter Ctr provides the saturation compensator SatC with a variation amplitude s9 which is based on the luminance-filtered signal s3. If it is considered more appropriate to determine the brightening factor in accordance with a variation amplitude of an image component other than the luminance, signal s2 may be supplied to the saturation compensator SatC.

Saturation compensation may be integrated in the replacing of pixel values, as by equation 2', but may also take place afterwards as a separate step. In the latter case, the correction process can be described by equation (2) (executed by the corrector Corr) complemented by a step (executed by the saturation compensator SatC) defined as follows:

$$x_{corr}^{*} = (1+\alpha)x_{corr}. \quad (5)$$

Saturation compensation may be effectuated in other ways than described above. As noted earlier in this disclosure, saturation leads to a loss of information, which is not possible to reconstruct on the basis of an affected video frame. The lost information more precisely relates to the values in the concealed interval which the saturated pixels would have had if flicker had not been present. At the price of introducing some noise into the corrected image, the saturated pixels can be randomly assigned new values in the concealed interval. In the simplest approach, values are sampled uniformly in the concealed interval, which is [168, 254] in the example shown in FIG. 5. A more refined variant is to generate values having the same distribution as the reference CDF. Returning to the example, this would imply sampling as many random values as there are saturated pixels, uniformly in the interval $F_{ref}$ ([168,254])=[0.87,1] (this is the interval of concealed accumulated probabilities), and then mapping them by $F_{ref}^{-1}$ before they are used for replacing the actual saturated pixel values. In the sense of statistical expectancy, this will ensure that the CDF of the corrected image coincides with the reference CDF.

While the invention has been illustrated and described in detail in the drawings and foregoing description, such illustration and description are to be considered illustrative or exemplary and not restrictive; the invention is not limited to the disclosed embodiment. It is understood that some components that are included in the disclosed embodiments are optional. For example, the device shown in FIG. 4 includes several means for extracting a sub-region of a frame, a component of a compound signal etc.: the frame region selector FrRS, the pixel selector PixS, the luminance filter LumF and the frame selector FrS. In embodiments where structural simplicity is preferred over computational efficiency, one or more of these may be omitted (after necessary re-wiring). Likewise, the luminance filter LumF would be superfluous in a device adapted to process monochrome video data.

Other variations to the disclosed embodiments can be understood and effected by those skilled in the art in practicing the claimed invention, from a study of the drawings, the disclosure, and the appended claims. The mere fact that certain measures are recited in mutually different dependent claims does not indicate that a combination of these measures cannot be used to advantage. Any reference signs in the claims should not be construed as limiting the scope.

The invention claimed is:

1. A method for detecting undesired temporal luminance variations in a sequence of video frames, wherein the method includes:
   generating a plurality of frame luminance signals based on the sequence of video frames;
   generating a global luminance signal based on the plurality of frame luminance signals;
   computing an estimated variation frequency of the plurality of frame luminance signals with respect to the global luminance signal;
   determining, by a processor in response to instructions stored on a non-transitory computer readable medium, an expected variation frequency based on a frame rate of the sequence of video frames and an illumination frequency; and
   determining whether a difference between the estimated variation frequency and the expected variation frequency exceeds a tolerance; and
   on a condition that the difference is less than the tolerance, correcting temporal luminance variations in the sequence of video frames, wherein correcting temporal luminance variations includes:
   selecting a set of frames to be corrected;
   for a current frame from the set of frames:
      generating a cumulative distribution function for an image component of the current frame,
      identifying a value of the cumulative distribution function corresponding to a value of a pixel from the image component,
      identifying a value of a reference cumulative distribution function such that a difference between the value of the cumulative distribution function and the value of the reference cumulative distribution function is minimized, and generating a corrected frame by replacing the value of the pixel with the corrected value.

2. A method according to claim 1, wherein determining the estimated variation frequency includes counting crossings per unit time of the frame luminance signal with respect to the global signal.

3. The method of claim 2, wherein counting crossings includes ignoring a crossing on a condition that a difference between the frame luminance signal and the global luminance signal is less than a second tolerance.

4. The method of claim 1, wherein the reference cumulative distribution function is based on one or more previous frames preceding the set of frames to be corrected.

5. The method of claim 1, wherein the image component a linear luminance component, a linear primary color component, a gamma-compressed luminance component, a gamma compressed primary color component, or a linear combination of two or more of a linear luminance component, a linear primary color component, a gamma-compressed luminance component, and a gamma-compressed primary color component.

6. The method of claim 1, wherein identifying the value of the reference cumulative distribution function includes:
generating a low-pass filtered cumulative distribution function based on a cumulative distribution function for an image component of a previous frame corresponding to the image component of the current frame; and
identifying the value from the low-pass filtered cumulative distribution function.

7. The method of claim 1, wherein the sequence of video frames includes a plurality of previous frames preceding the set of frames to be corrected, and wherein identifying the value of the reference cumulative distribution function includes:
generating a plurality of low-pass filtered cumulative distribution functions wherein each low-pass filtered cumulative distribution function from the plurality of low-pass filtered cumulative distribution functions is based on a respective cumulative distribution function for an image component of a respective previous frame corresponding to the image component of the current frame; and
identifying the value based on the plurality of low-pass filtered cumulative distribution functions.

8. The method of claim 7, wherein identifying the value based on the plurality of low-pass filtered cumulative distribution functions includes identifying the value based on an average of the plurality of low-pass filtered cumulative distribution functions.

9. The method of claim 1, wherein generating the corrected frame includes: replacing the corrected value with a brightened value.

10. The method of claim 9, wherein replacing the corrected value with the brightened value includes determining the brightened value based on the corrected value, a brightening factor, and a maximum admissible luminance value.

11. The method of claim 1, wherein identifying the value of the reference cumulative distribution function includes:
identifying a value of a first reference cumulative distribution function based on a first previous frame;
identifying a value of a second reference cumulative distribution function based on a second previous frame;
generating an interpolated value based on the value of the first reference cumulative distribution function and the value of the second reference cumulative distribution function; and
using the interpolated value as the value of the reference cumulative distribution function.

12. The method of claim 1, wherein identifying the value of the reference cumulative distribution function includes:
generating an upsampled reference cumulative distribution function based on the reference cumulative distribution function;
generating a smoothed upsampled reference cumulative distribution function based on the upsampled reference cumulative distribution function; and
using the smoothed upsampled reference cumulative distribution function as the reference cumulative distribution function.

13. The method of claim 1, wherein the illumination frequency is based on a visible object in the sequence of video frames.

14. The method of claim 1, wherein the illumination frequency is a multiple of an electric mains frequency.

15. The method of claim 1, wherein determining the expected variation frequency includes determining the absolute value of a difference between the illumination frequency and a product of the frame rate and a value such that the value is greater than a quotient of the illumination frequency divided by the frame rate minus 0.5 and is less than the quotient plus 0.5.

16. A method comprising:
generating a plurality of frame luminance signals wherein each frame luminance signal is based on a luminance of a respective frame from a sequence of video frames;
generating a global luminance signal based on the plurality of frame luminance signals;
computing an estimated variation frequency of the plurality of frame luminance signals with respect to the global luminance signal; and
on a condition that a difference between the estimated variation frequency and an expected variation frequency is within a tolerance for a current frame from sequence of video frames generating, by a processor in response to instructions stored on a non-transitory computer readable medium, a corrected frame based on the current frame by:
generating a cumulative distribution function for an image component of the current frame,
identifying a value of the cumulative distribution function corresponding to a value of a pixel from the image component,
identifying a value of a reference cumulative distribution function such that a difference between the value of the cumulative distribution function and the value of the reference cumulative distribution function is minimized, and
replacing the value of the pixel with the corrected value.

17. A method according to claim 16, wherein determining the estimated variation frequency includes counting crossings per unit time of the frame luminance signal with respect to the global luminance signal, wherein counting crossings includes ignoring a crossing on a condition that a difference between the frame luminance signal and the global luminance signal is less than a second tolerance.

18. The method of claim 16, wherein the sequence of video frames includes a plurality of previous frames preceding the current frame, and wherein identifying the value of the reference cumulative distribution function includes:
generating a plurality of low-pass filtered cumulative distribution functions wherein each low-pass filtered cumulative distribution function from the plurality of low-pass filtered cumulative distribution functions is based on a respective cumulative distribution function for an image component of a respective previous frame corresponding to the image component of the current frame; and identifying the value based on the plurality of low-pass filtered cumulative distribution functions.

19. The method of claim 16, wherein generating the corrected frame includes:

determining a brightened value based on the corrected value, a brightening factor, and a maximum admissible luminance value; and replacing the corrected value with the brightened value.

* * * * *